(12) United States Patent
Higashi

(10) Patent No.: US 8,836,999 B2
(45) Date of Patent: Sep. 16, 2014

(54) IMAGE CORRECTION APPARATUS, OVERHEAD IMAGE READING APPARATUS, IMAGE CORRECTION METHOD, AND PROGRAM

(71) Applicant: PFU Limited, Ishikawa (JP)

(72) Inventor: Makoto Higashi, Ishikawa (JP)

(73) Assignee: PFU Limited, Ishikawa (JP)

( * ) Notice: Subject to any disclaimer, the term of this patent is extended or adjusted under 35 U.S.C. 154(b) by 21 days.

(21) Appl. No.: 13/722,767

(22) Filed: Dec. 20, 2012

(65) Prior Publication Data

US 2013/0155473 A1 Jun. 20, 2013

(30) Foreign Application Priority Data

Dec. 20, 2011 (JP) ................. 2011-278183

(51) Int. Cl.
  *H04N 1/60* (2006.01)
  *G06K 9/40* (2006.01)
  *H04N 1/409* (2006.01)

(52) U.S. Cl.
  CPC ...................................... *H04N 1/409* (2013.01)
  USPC ............................................ 358/1.9; 382/260

(58) Field of Classification Search
  USPC .............................. 358/1.9; 382/260; 348/246
  See application file for complete search history.

(56) References Cited

U.S. PATENT DOCUMENTS

| 6,275,307 B1 | 8/2001 | Segawa |
| 2011/0216984 A1* | 9/2011 | Tezuka ........................ 382/260 |
| 2012/0099008 A1* | 4/2012 | Horikawa et al. ............. 348/246 |

FOREIGN PATENT DOCUMENTS

JP      10-336404 A      12/1998

* cited by examiner

*Primary Examiner* — Charlotte M Baker
(74) *Attorney, Agent, or Firm* — McDermott Will & Emery LLP

(57) ABSTRACT

An image correction apparatus includes a read image acquiring unit that acquires read image data generated by an imaging device that moves in a sub-scanning direction with respect to a reading medium irradiated with an environmental light to read the reading medium; a selecting unit that selects a correction filter for correcting a pixel of interest in the acquired read image data based on brightness or luminance component of a pixel in a determination filter including the pixel of interest; and a correction unit that corrects tone data of the pixel of interest based on the correction filter selected by the selecting unit. The determination filter includes a plurality of determination filters in which a number of pixels to be used in the sub-scanning direction differs.

6 Claims, 7 Drawing Sheets

IMAGE CORRECTION APPARATUS, OVERHEAD IMAGE READING APPARATUS, IMAGE CORRECTION METHOD, AND PROGRAM

CROSS-REFERENCE TO RELATED APPLICATION

This application is based upon and claims the benefit of priority from Japanese Patent Application No. 2011-278183, filed Dec. 20, 2011, the entire contents of which are incorporated herein by reference.

BACKGROUND OF THE INVENTION

1. Field of the Invention

The present invention relates to an image correction apparatus, an overhead image reading apparatus, an image correction method, and a program.

2. Description of the Related Art

There are conventionally various types of image reading apparatuses for reading an image of a document and electrically processing the same. For example, there is an image reading apparatus which two-dimensionally reads the image by moving a reading range in a sub-scanning direction while carrying out reading by a one-dimensional image sensor. There also provided are some image reading apparatuses which read the document under an environment an environmental light around the image reading apparatus such as light from an illumination arranged in a room exists when the apparatus read the document mounted on a mounting board with the image sensor.

However, if the two-dimensional image is read with the one-dimensional image sensor while scanning the document in the sub-scanning direction under the environment the document is irradiated with light of a fluorescent lamp, horizontal strips may occur in the read image due to flickers caused by the light emission by an alternating current. Thus some conventional image reading apparatuses remove such horizontal stripes of the image caused by the flickers.

For instance, in the image reading apparatus described in Japanese Patent Application Raid-open No. 10-336404, a flicker reducing circuit for increasing and decreasing the image signal is arranged by an analog circuit, and the image signal is increased and decreased by the flicker reducing circuit according to the increase and decrease of the image signal of a reference region set in a region to be read by the linear image sensor. The horizontal stripes of the image caused by the flickers are thereby removed.

However, if a unit for reducing the horizontal stripes of the image is configured by the analog circuit such as the flicker reducing circuit in Japanese Patent Application Laid-open No. 10-336404, that is, if configured by hardware, this may become a factor in complicating the configuration of the entire apparatus.

SUMMARY OF THE INVENTION

It is an object of the present invention to at least partially solve the problems in the conventional technology.

According to an aspect of the present invention, an image correction apparatus includes: a read image acquiring unit that acquires read image data generated by an imaging device that moves in a sub-scanning direction with respect to a reading medium irradiated with an environmental light to read the reading medium; a selecting unit that selects a correction filter for correcting a pixel of interest in the acquired read image data based on brightness or luminance component of a pixel in a determination filter including the pixel of interest; and a correction unit that corrects tone data of the pixel of interest based on the correction filter selected by the selecting unit. The determination filter includes a plurality of determination filters in which a number of pixels to be used in the sub-scanning direction differs.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments of an image correction apparatus, an overhead image reading apparatus, an image correction method, and a program according to the present invention will be hereinafter described in detail based on the drawings. It should be noted that the present invention is not limited by such embodiments. The configuring elements in the following embodiments include those that are replaceable and obvious by those skilled in the art, or those that are substantially the same.

Figure 1:
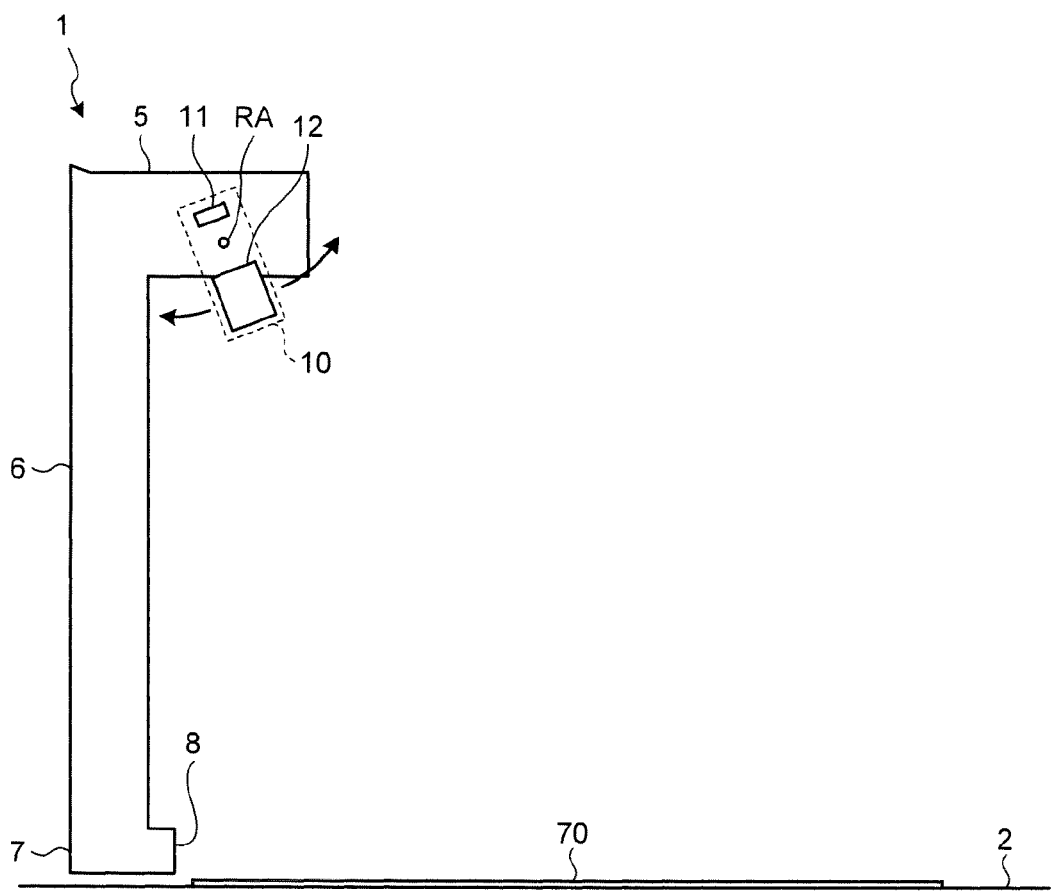
FIG. 1 is a schematic diagram of an overhead image reading apparatus according to an embodiment of the present invention.
Figure 2:
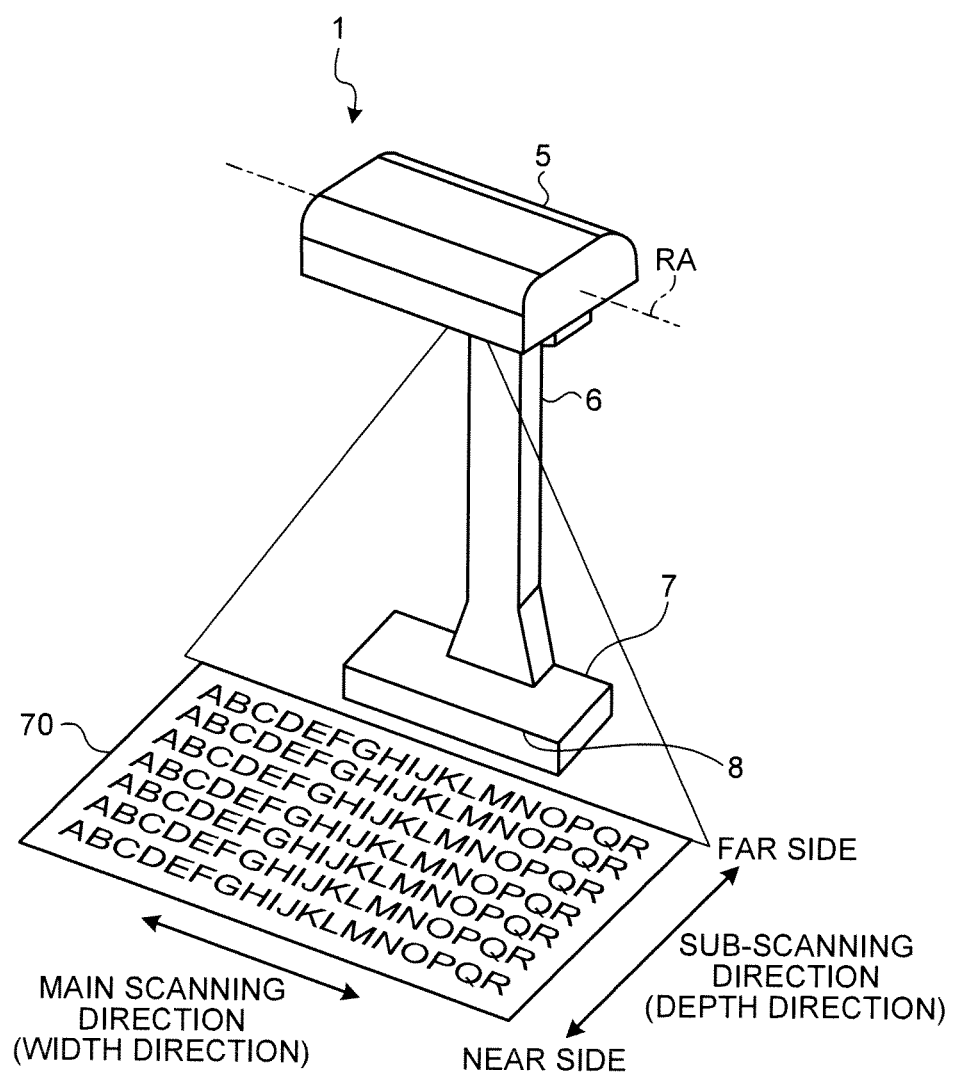
FIG. 2 is a perspective view of the overhead image reading apparatus illustrated in FIG. 1.

FIG. 1 is a schematic diagram of an overhead image reading apparatus 1 according to an embodiment. FIG. 2 is a perspective view of the overhead image reading apparatus 1 illustrated in FIG. 1. The overhead image reading apparatus 1 illustrated in FIGS. 1 and 2 includes an optical unit 10, which is an imaging device for imaging a subject, a base 7 that functions as a leg section when mounting the overhead image reading apparatus 1 on an arbitrary position, an arm 6, which is an imaging device supporting section for arranging the optical unit 10 having one end connecting to the base 7 above a document 70 serving as a recording medium, and an optical unit holding section 5 arranged on a side opposite to the side to be connected to the base 7 in the arm 6 and adapted to rotatably hold the optical unit 10.

Among them, the base 7 is a member formed to be mountable on a mounting surface 2, and the like, and adapted to support the entire overhead image reading apparatus 1. The base 7 is formed to a flat shape, where a lower surface side acts as a contacting surface to the mounting surface 2 when mounting on the mounting surface 2. In the overhead image reading apparatus 1 according to the present embodiment, the base 7 has a rectangular solid shape flat in a vertical direction or a shape similar thereto in a normal usage mode of the overhead image reading apparatus 1. Thus, the base 7 has a length in the vertical direction, that is, a thickness in the vertical direction smaller than a length in each direction of a width direction (main scanning direction to be described later) and a depth direction (sub-scanning direction to be described later). The length in the width direction of the base 7 is greater than the length in the depth direction.

The arm 6 has a lower end side connected to the base 7, and is extended towards the upper side from the base 7. A tapered shape is formed near the lower end of the arm 6 so that a cross-sectional area when seen in an up-down direction expands towards the lower side. The arm 6 is connected to one side in an upper surface of the base 7. Specifically, the arm 6 is connected to a side positioned on an opposite side of a side where the document 70, which is a reading medium, is arranged, of the four sides forming the edges of the upper surface of the base 7. In other words, the arm 6 is connected to an end on the far side distant from the document 70 in the base 7. The arm 6 is connected to the base 7 at a position on the side distant from the document 70 and near a central part in the width direction of the base 7.

Thus, the base 7 connected with the arm 6 has a surface positioned on the side opposite to a surface on the side connected with the arm 6 of the four surfaces of the sides of the base 7 becomes a surface that faces a user of the overhead image reading apparatus 1. The surface facing the user at the side surface of the base 7 is a base front surface 8. In the description of the overhead image reading apparatus 1 according to the present embodiment, a direction parallel to the mounting surface 2 and parallel to a side on the base front surface 8 side of the base 7 formed to a rectangular solid shape is assumed as a width direction, and a direction parallel to the mounting surface 2 and orthogonal to the width direction is assumed as a depth direction. When the user is facing the base front surface 8, a side close to the user in the depth direction will be described as a near side and a side away from the user will be described as a far side.

The optical unit holding section 5 is connected to a side opposite to an end on the side connected to the base 7 in the arm 6 arranged in the above manner. The optical unit holding section 5 projects out from the arm 6 towards the near side in the depth direction and to both sides in the width direction. In other words, the optical unit holding section 5 juts out from the arm 6 in the direction same as the direction the base 7 juts out in the depth direction and juts out from the arm 6 to both sides in the width direction.

The optical unit 10 is rotatably held by the optical unit holding section 5 connected to the arm 6, thus the optical unit 10 is held in a relatively rotatable manner with respect to the arm 6 and the base 7. Specifically, the optical unit holding section 5 interiorly includes a motor 21 (see FIG. 3) that can be driven at an arbitrary rotation angle, where the optical unit 10 is arranged in a state rotatable at an arbitrary rotation angle by a power generated by the motor 21 with a rotation axis RA extending in the width direction as a center. The optical unit holding section 5 holds the optical unit 10 with the optical unit 10 facing outside from at least the surface on the lower side. Operation members such as a power switch (not illustrated) and an image reading start switch (not illustrated) of the overhead image reading apparatus 1 are arranged on the arm 6 or the base 7.

The optical unit 10 held by the optical unit holding section 5 includes a line sensor 11, which is an image reading section capable of reading the image of the document 70 by including a plurality of light receiving elements (not illustrated), and a lens 12 for collecting the light from the direction of the document 70 with respect to the line sensor 11. The light receiving elements of the line sensor 11 are arranged in a one-dimensional array form in a direction parallel to the rotation axis RA, and are arranged as a light receiving portion for converting the received light to an electrical signal when receiving the light. The line sensor 11 can read the image of the document 70 in a one-dimensional direction parallel to the rotation axis RA by arranging the plurality of light receiving elements in the one-dimensional array form.

The optical unit holding section 5 holds the optical unit 10 including the line sensor 11 and the lens 12 so that the optical unit holding section 5 holds the line sensor 11 and the lens 12 in a relatively rotatable manner with respect to the arm 6 with the rotation axis RA parallel to the arraying direction of the light receiving elements as a center. The optical unit 10 has the lens 12 positioned on the lower side of the line sensor 11 and the lens 12 positioned at the lower end side of the optical unit 10 so as to be held by the optical unit holding section 5 while facing outside. Thus, the lens 12 can collect the light from the lower side of the optical unit 10 towards the optical unit 10 with respect to the line sensor 11.

The light receiving elements of the line sensor 11 include a light receiving element for detecting red light, a light receiving element for detecting green light, and a light receiving element for detecting blue light. Thus, a color image can be read by combining the signals of the lights detected by each light receiving element.

Figure 3:
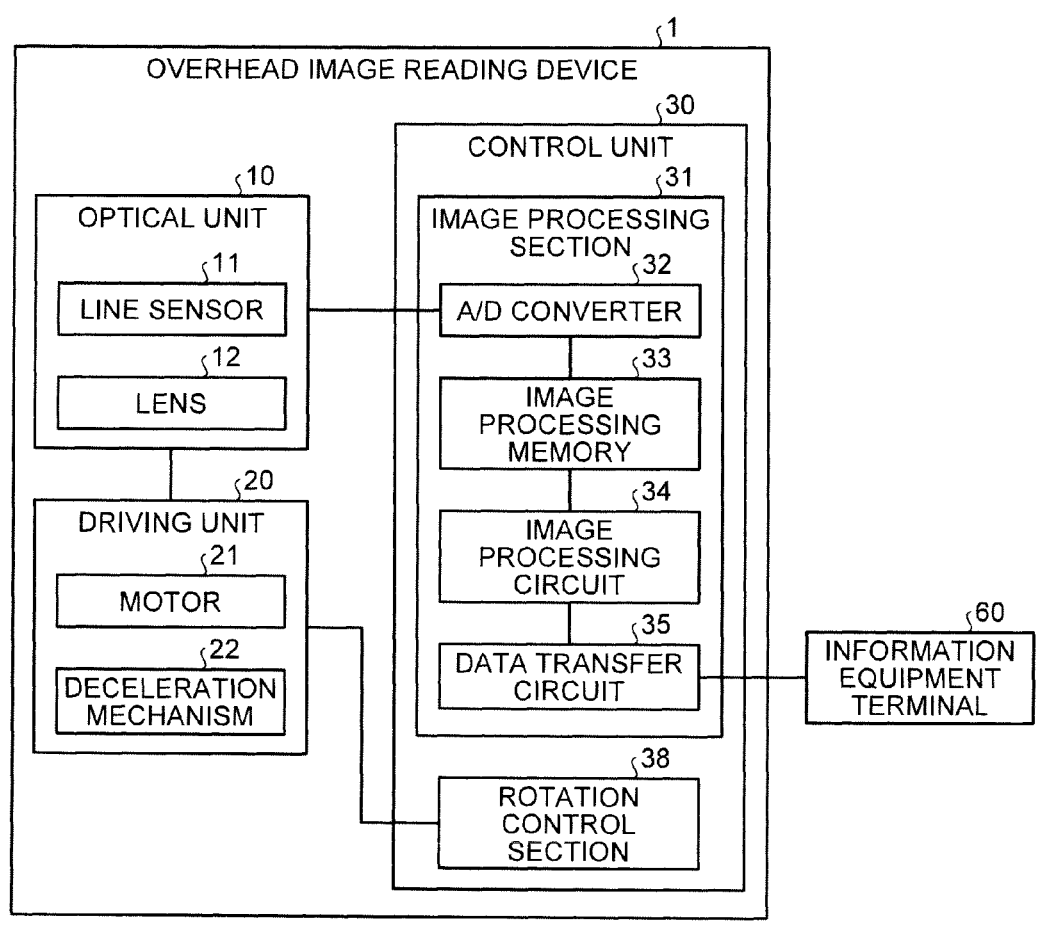
FIG. 3 is an explanatory view illustrating an outline of a configuration of the overhead image reading apparatus illustrated in FIG. 1.

FIG. 3 is an explanatory view illustrating an outline of a configuration of the overhead image reading apparatus 1 illustrated in FIG. 1. The overhead image reading apparatus 1 arranged in the above manner includes a control unit 30 for performing entire control of the entire overhead image reading apparatus 1. The control unit 30 is connected with the optical unit 10, and a driving unit 20, which is a sub-scanning direction driving unit, for moving a reading position on the document 70 by the optical unit 10 in a sub-scanning direction, to be described later, by rotating the optical unit 10, where the processing of the image and the driving control of the motor 21 can be carried out in the control unit 30. The hardware configuration of the control unit 30 has a known configuration including a processing section such as a CPU (Central Processing Unit), and a storage section such as a RAM (Random Access Memory), and the description thereof will be omitted.

The control unit 30 includes an image processing section 31 for carrying out image processing based on the signal of the light received by the optical unit 10 and arranged to also serve as an image correction apparatus for carrying out correction of the image, and a rotation control section 38 for carrying out the driving control of the driving unit 20. The optical unit 10 connected to the control unit 30 has the line sensor 11 of the optical unit 10 and the line sensor 11 is connected to the image processing section 31 of the control unit 30. Thus, the electrical signal photoelectric-converted when receiving light at the optical unit 10 can be received by the image processing section 31.

With respect to the driving unit 20 connected to the control unit 30, the motor 21 of the driving unit 20 is connected to the rotation control section 38 of the control unit 30. Thus, the driving control of the motor 21 can be carried out by the rotation control section 38. The driving unit 20 includes a deceleration mechanism 22 configured by combining a plurality of gears in addition to the motor 21, where the power generated by the motor 21 is transmitted to the optical unit 10 through the deceleration mechanism 22 thus rotating the optical unit 10.

The image processing section 31 includes an A/D converter 32 for converting a signal received from the line sensor 11 in an analog signal state to a digital signal, an image processing memory 33 for temporarily storing data when carrying out image processing based on the signal received from the line sensor 11, an image processing circuit 34 for carrying out various types of calculation processes when carrying out image processing, and a data transfer circuit 35 for transmitting and receiving signals with an information equipment terminal 60 such as a PC (Personal Computer) exterior to the overhead image reading apparatus 1. In other words, the overhead image reading apparatus 1 is connected with the information equipment terminal 60 such as the PC, so that signals such as the image data can be transmitted and received with the information equipment terminal 60.

The storage section of the control unit 30 stores computer programs for causing the image processing section 31 to carry out image processing, and computer programs for causing the driving control to be carried out on the driving unit 20 by the rotation control section 38. The image processing section 31 and the rotation control section 38 carry out processes such as image processing including correction of the image data, and the rotation control of the motor 21 by carrying out the calculation process in accordance with the computer program.

The overhead image reading apparatus 1 according to the present embodiment has the above configuration, and has the operations described below. The overhead image reading apparatus 1 according to the present embodiment is used by being mounted on the top of a desk, for example, when reading the image of the document 70, the portion where the overhead image reading apparatus 1 is mounted is assumed as the mounting surface 2 and the document 70 is read while being mounted on the mounting surface 2 and irradiated with an environmental light.

When mounting the overhead image reading apparatus 1 on the mounting surface 2, it is mounted with the surface on the opposite side of the surface on the side the arm 6 is connected in the base 7 facing the mounting surface 2 and making contact with the mounting surface 2. The base 7 can be mounted on the mounting surface 2 in such manner, and the arm 6 can be connected to the base 7. Thus, the arm 6 is fixed to the mounting surface 2 when the base 7 is mounted on the mounting surface 2.

Since the arm 6 is fixed to the mounting surface 2 by mounting the base 7 on the mounting surface 2, the optical unit holding section 5 supported by the arm 6 has a distance from the mounting surface 2 maintained at a constant distance. Thus, the optical unit 10 held by the optical unit holding section 5 also has the distance from the mounting surface 2 maintained at a constant distance.

When mounting the document 70 on the mounting surface 2 when reading the image of the document 70 with the overhead image reading apparatus 1 with the base 7 mounted on the mounting surface 2, the document 70 is mounted on the mounting surface 2 such that one side of the document 70 makes contact with the base front surface 8. That is, the document 70 is mounted on the mounting surface 2 such that one side is parallel to the base front surface 8. The optical unit holding section 5 has the direction jutting out from the arm 6 in the depth direction jutting out in the direction same as the direction the base 7 is jutting out, and hence one part of the optical unit holding section 5 faces the document 70 in the up and down direction when the document 70 is mounted such that one side makes contact with the base front surface 8.

When reading the image of the document 70, the document 70 is mounted on the mounting surface 2 in such manner and the input operation to start the reading of the document 70 is performed on an image reading start switch. When the user performs the input operation on the image reading start switch, the input to the start of reading is transmitted to the control unit 30. The control unit 30 receiving the signal to start the reading from the image reading start switch activates each necessary section to read the image of the document 70. In other words, the motor 21 of the driving unit 20 is controlled with the rotation control section 38 while receiving the signal of the information of the light detected by the light receiving element of the line sensor 11 with the image processing section 31 to rotate the optical unit 10 with the rotation axis RA as a center. During the reading of the image, the image is read while rotating the optical unit 10.

Describing the reading operation of the image with the overhead image reading apparatus 1, the line sensor 11 includes a plurality of light receiving elements arrayed in a one-dimensional array form in a direction parallel to the rotation axis RA. Thus, the reading direction of the image in the line sensor 11 is a direction parallel to the rotation axis RA, which direction is the main scanning direction when reading the image with the overhead image reading apparatus 1. When reading the image with the overhead image reading apparatus 1, the surrounding environmental light such as the light irradiated from a fluorescent lamp installed in a room where the overhead image reading apparatus 1 is arranged is reflected by the document 70, and such reflected light is received by the optical unit 10 to read the image.

Thus, when reading the image, the light in the main scanning direction of the light reflected by the document 70 and directed from the document 70 towards the optical unit 10 is received by the plurality of light receiving elements arranged one-dimensionally to receive the one-dimensional light in the main scanning direction with the line sensor 11. The signal of the information of the light received by the line sensor 11 is received by the image processing section 31 and the image processing section 31 reads the image information based on such received signal. Thus, the image processing section 31 that received the signal of the information of the one-dimensional light in the main scanning direction from the line sensor 11 reads the image information in the direction parallel to the rotation axis RA on the document 70.

When reading the image, the optical unit 10 is rotated with the rotation axis RA as a center while reading the image information in the direction parallel to the rotation axis RA with the image processing section 31 based on the signal from the line sensor 11 to relatively rotate the optical unit 10 with respect to the document 70. Thus, the reading position of the image information in the image processing section 31 through the line sensor 11 on the document 70 moves in the sub-scanning direction, which is the direction orthogonal to the main scanning direction. When reading the image of the document 70 with the overhead image reading apparatus 1, the two-dimensional image information is read by moving the reading position on the document 70 in the sub-scanning direction while reading the one-dimensional image in the main scanning direction. In other words, the read image data generated by reading the document 70 with the optical unit 10 is acquired with the image processing section 31. Specifically, the read image data is acquired by the image processing memory 33 of the image processing section 31, and such image processing memory 33 is arranged as a read image acquiring unit for acquiring the read image data generated when the optical unit 10 reads the document 70.

Figure 4:
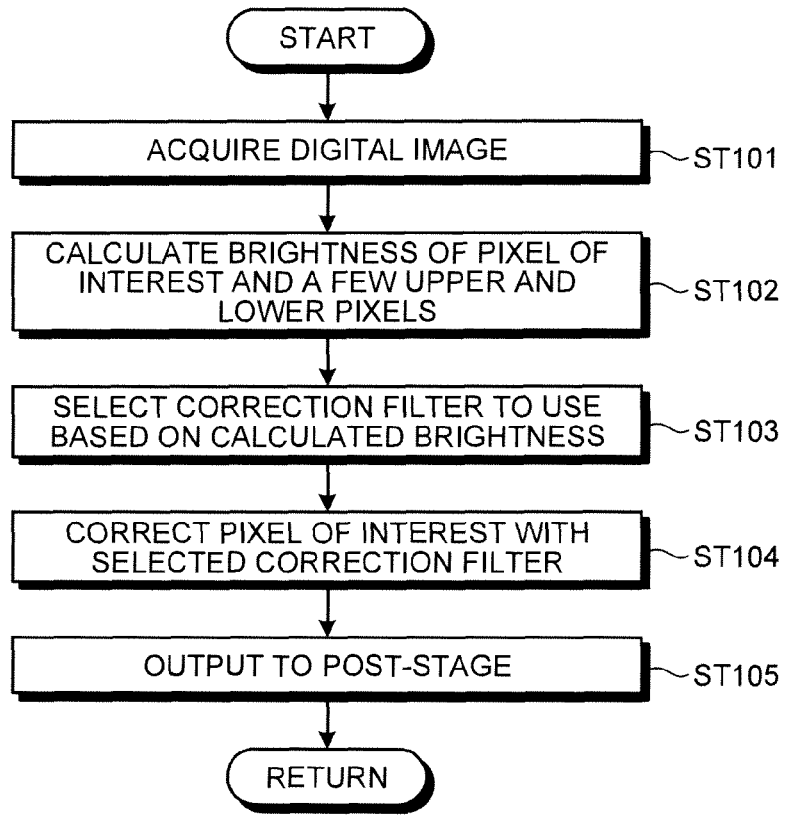
FIG. 4 is a flowchart illustrating an outline of a processing procedure when removing horizontal stripes of an image caused by the flicker.

The image processing section 31 performs a process of removing horizontal stripes of the image caused by the flickers through an image correction method according to the present embodiment when reading the image. FIG. 4 is a flowchart illustrating an outline of a processing procedure when removing the horizontal stripes of the image caused by the flickers. When reading the image of the document 70 with the image processing section 31, the signal of the information of the light received by the line sensor 11 is converted from an analog signal to a digital signal with the A/D converter 32 and the converted signal is stored in the image processing memory 33 to acquire the digital image (step ST101).

A brightness of a pixel of interest and a few upper and lower pixels of the pixel of interest is then calculated (step ST102). That is, the image information by the digital signal is a collection of an infinite number of pixel data configuring one image, where the process of removing the horizontal stripes is carried out for each one of the infinite number of pixels and the pixel of interest corresponds to the pixel on which the process is performed in the processing procedure of this time.

Figure 5:
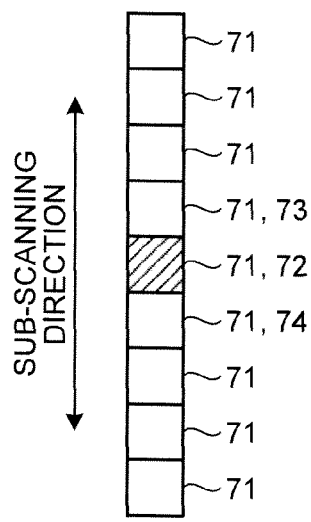
FIG. 5 is an explanatory view of a pixel of interest and a pixel to perform the calculation of brightness.

FIG. 5 is an explanatory view of the pixel of interest and the pixel on which the calculation of the brightness is carried out. When performing the process of removing the horizontal stripes, the brightness of a pixel of interest 72 and a few upper and lower pixels 71 of the pixel of interest 72 is calculated. The up and down direction is the sub-scanning direction of when reading the image with the image processing section 31 through the optical unit 10. That is, when seen from the pixel of interest 72 which is the pixel 71 to perform the process in the processing procedure of this time in the image data stored in the image processing memory 33, the data of a plurality of pixels 71 positioned on both sides in the sub-scanning direction is acquired by the image processing circuit 34, and the brightness is calculated by the image processing circuit 34.

A correction filter to be used is selected based on the calculated brightness (step ST103). In the control of removing the horizontal stripes, the horizontal stripes are reduced by correcting the RGB data of an infinite number of pixels 71 configuring one image, where the correction filter corresponds to a filter for correcting the pixel of interest 72 in the present processing procedure carried out for every infinite number of pixels 71. In other words, the correction filter calculates the pixel of interest 72 from the pixel 71 in the correction filter based on the calculated brightness. A filter for correcting the pixel of interest 72 using a tone data of the plurality of pixels 71, for example, is used for the correction filter, and specifically, a function for correcting the RGB data of the pixel of interest 72 based on the RFB data of the upper and lower pixels 71 of the pixel of interest 72 is used. Thus, the correction filter for correcting the pixel of interest 72 of the read image data acquired by the image processing section 31 is set in plurals in advance, and stored in the control unit 30.

That is, the image data of one image has a difference in the degree of change in the RGB data between the pixels 71 depending on the location on the image. Thus, the correction filter is set in plurals in advance so that the pixel of interest 72 can be appropriately corrected according to the degree of change in the RGB data between the pixels 71. The image processing circuit 34 selects the correction filter to use for the correction of the pixel of interest 72 from the plurality of correction filters according to the calculated brightness.

The pixel of interest 72 is then corrected with the selected correction filter (step ST104). In other words, the calculation for correcting the RGB data of the pixel of interest 72 is carried out by the image processing circuit 34 using the selected correction filter to correct the pixel of interest 72. Thus, the data of the corrected pixel of interest 72 is output to the post-stage in the processing step of image processing (step ST105). For instance, the data of the calculated pixel of interest 72 is output from the data transfer circuit 35 to the information equipment terminal 60. Such processes are performed on the infinite number of pixels 71 of the image data of the read document 70 while rotating the optical unit 10 to remove the horizontal stripes of the image caused by the flickers.

The horizontal stripes of the image are removed by selecting the correction filter based on the brightness of the pixel of interest 72 and the few upper and lower pixels 71 of the pixel of interest 72, and correcting the pixel of interest 72 with the correction filter, where such correction is carried out by the image processing circuit 34 of the image processing section 31 of the control unit 30.

Figure 6:
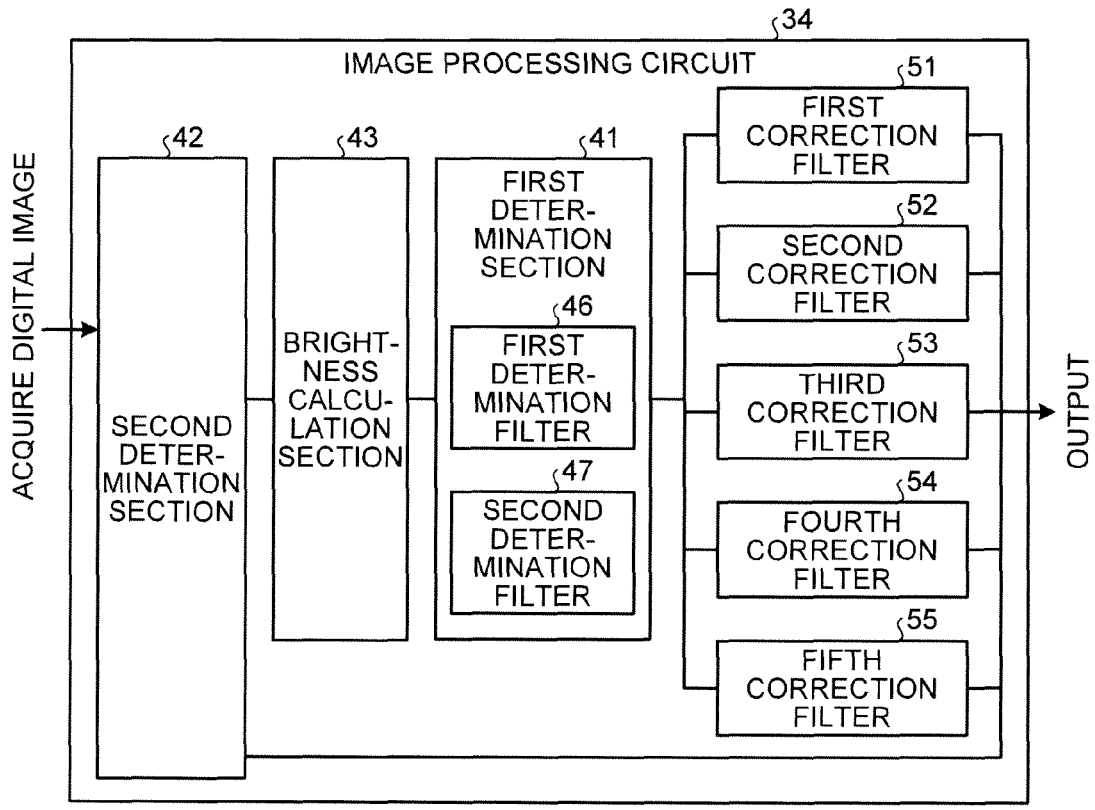
FIG. 6 is a detailed diagram illustrating a configuration of an image processing circuit.

FIG. 6 is a detailed diagram illustrating a configuration of the image processing circuit. The image processing circuit 34 includes a brightness calculation section 43 for carrying out the calculation of the brightness of the pixel of interest 72 and the few upper and lower pixels 71 of the pixel of interest 72 (step ST102), as described above. The image processing circuit 34 includes a first determination section 41 for selecting the correction filter to use based on the brightness calculated in the above manner (step ST103). The first determination section 41 includes two determination filters, a first determination filter 46 and a second determination filter 47, for the filter to be used when selecting the correction filter to correct the pixel of interest 72 from the plurality of correction filters. The determination filter is used to determine whether the image is white, black, or halftone, and is also used to determine whether the image is a steeply changing portion, that is, an edge portion.

Figure 7:
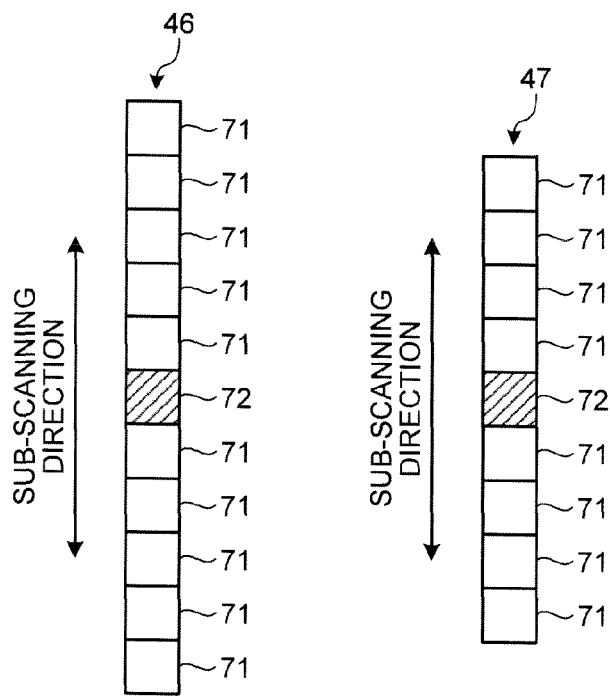
FIG. 7 is an explanatory view of a first determination filter and a second determination filter.

FIG. 7 is an explanatory view of the first determination filter 46 and the second determination filter 47. The first determination filter 46 and the second determination filter 47 are filters for selecting the pixel of interest 72 and the plurality of pixels 71 positioned on both sides of the pixel of interest 72 in the sub-scanning direction. The first determination filter 46 is a filter for selecting respectively five pixels 71 of the plurality of pixels 71 positioned on both sides of the pixel of interest 72 in the sub-scanning direction, and the pixel of interest 72. The first determination filter 46 is a filter used for averaging of a maximum extent by correcting the pixel of interest 72 using the correction filter in which the range of the pixel 71 to use for the correction of the pixel of interest 72 is wide of the plurality of correction filters.

The second determination filter 47 is a filter for selecting respectively four pixels 71 of the plurality of pixels 71 positioned on both sides of the pixel of interest 72 in the sub-scanning direction, and the pixel of interest 72. That is, if the determination of the image is carried out with only the first determination filter 46, the majority of the portion is determined as the edge portion in the halftone region having concave and convex irregularities in change, and the averaging of a maximum extent may not be effective. Thus, the second determination filter 47 is prepared as a filter used for the determination of only a small region, where determination can be made to carry out the averaging of a maximum extent of a narrow range or not to carry out the averaging by again determining the determination in the region where the determination is carried out with the first determination filter 46 with the second determination filter 47. The first determination section 41 includes two determination filters which number of pixels 71 to be used in the sub-scanning direction differs.

The image processing circuit 34 includes the brightness calculation section 43 for calculating the brightness of the pixel 71 selected by the first determination filter 46 and the brightness of the pixel 71 selected by the second determination filter 47. The first determination section 41 uses the first determination filter 46 and the second determination filter 47, specifically, uses the brightness calculated by the brightness calculation section 43 to make a determination to select the correction filter for correcting the pixel of interest 72 from five correction filters, a first correction filter 51, a second correction filter 52, a third correction filter 53, a fourth correction filter 54, and a fifth correction filter 55. The five correction filters are such that the range of the pixel 71 to use in the correction of the pixel of interest 72 is smaller than the range of the pixel 71 selected in the determination filter. In other words, the number of pixels 71 to be used in the correction filter is less than the number of pixels to be used in the determination filter, which is respectively stored in the image processing circuit 34 as a function. The first determination section 41 is used as a selection unit for selecting the correction filter for correcting the pixel of interest 72 based on the brightness of the pixel of interest 72 and the pixel 71 in the determination filter.

Therefore, the image processing circuit 34 calculates the brightness from the RGB component of the pixel 71, and selects the correction filter based on the condition of the brightness in the determination filter. In other words, the image processing circuit 34 uses the brightness for the selection of the correction filter to respond to both monochrome images and color images. The image processing circuit 34 uses the first determination filter 46 and the second determination filter 47 in a case the region where the pixel of interest 72 is positioned is the halftone region to select the correction filter to use at the flat portion and the edge portion of the image.

Furthermore, the image processing circuit 34 includes a second determination section 42 for carrying out a determination on whether or not to perform the process of correcting the pixel of interest 72. The second determination section 42 determines whether or not to perform the process of correcting the pixel of interest 72 in accordance with the relative state of the pixel of interest 72 and the upper and lower pixels 71 thereof. The image processing circuit 34 performs the calculation process in each section to correct the pixel of interest 72, and outputs to the post stage in the processing step such as transmits the corrected data to the information equipment terminal 60 through the data transfer circuit 35.

The horizontal stripes of the image are removed mainly by performing the calculation process in each section of the image processing circuit 34, and correcting the pixel of interest 72, where the respective processes will be described in detail below.

Figure 8:
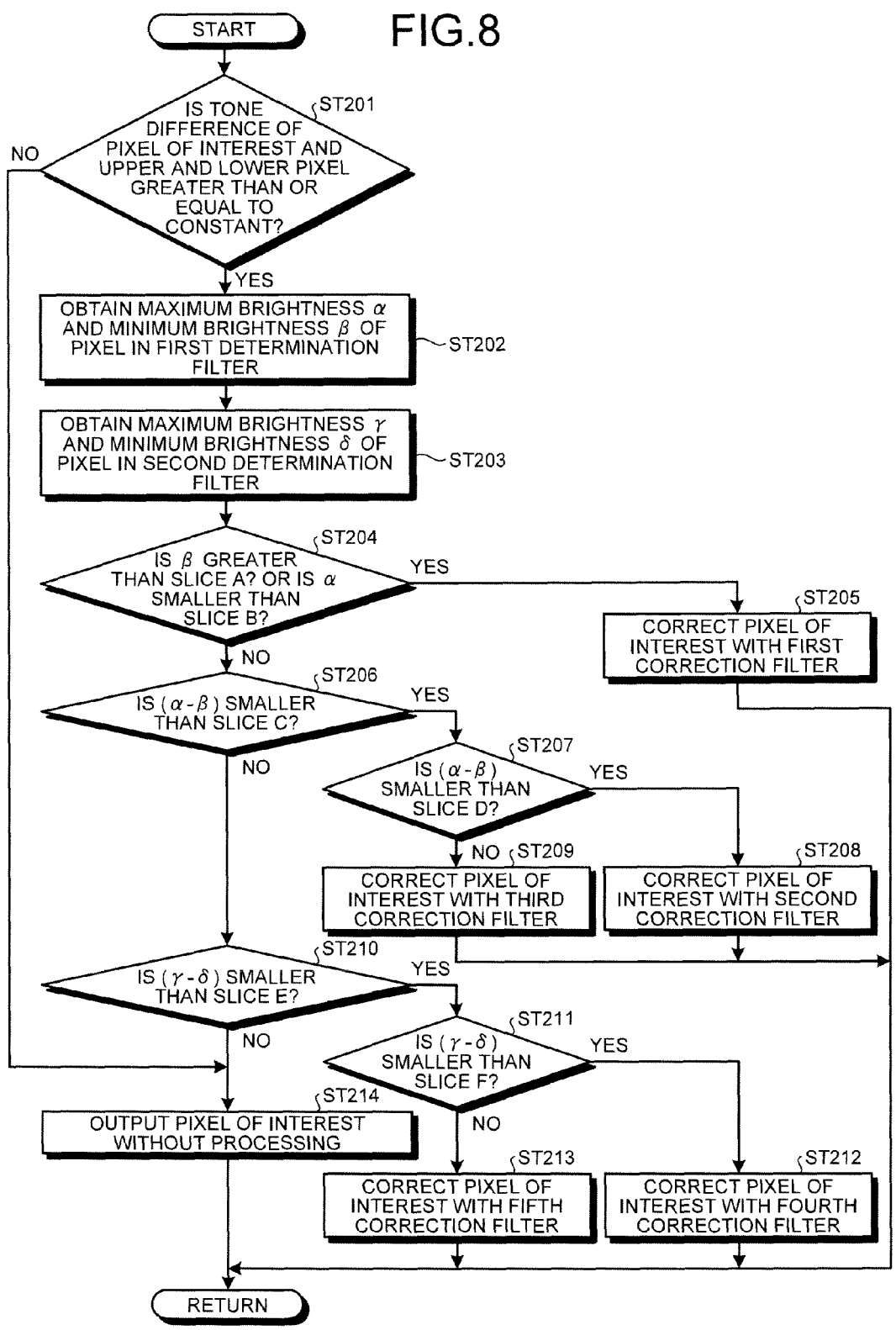
FIG. 8 is a flowchart illustrating a detailed processing procedure when removing horizontal stripes of an image caused by the flickers.

FIG. 8 is a flowchart illustrating a detailed processing procedure when removing the horizontal stripes of the image caused by the flickers. When performing the process of removing the horizontal stripes of the image, whether or not a tone difference between the pixel of interest 72 and the upper and lower pixels 71 in the processing procedure of this time is greater than or equal to a constant is first determined (step ST201). In other words, whether or not a difference in the tone difference of the pixel 71 adjacent to both sides of the pixel of interest 72 in the sub-scanning direction and the pixel of interest 72 is greater than or equal to a constant is determined. This determination is performed by the second determination section 42 of the image processing circuit 34.

Assuming one of the pixels 71 of the pixels 71 adjacent to both sides of the pixel of interest 72 in the sub-scanning direction as an upper pixel 73 and the other pixel 71 as a lower pixel 74 (see FIG. 5), the second determination section 42 calculates the tone difference using the RGB data of each of the pixel of interest 72, the upper pixel 73, and the lower pixel 74.

Specifically, assuming the values of the R, G, B of the pixel of interest 72 are r, g, b, and the values of the R, G, B of the upper pixel 73 are upper r, upper g, and upper b, the upper tone difference or the tone difference of the pixel of interest 72 and the upper pixel 73 is calculated with the following equation (1). Similarly, assuming the values of the R, G, B of the lower pixel 74 are lower r, lower g, and lower b, the lower tone difference or the tone difference of the pixel of interest 72 and the lower pixel 74 is calculated with the following equation (2).

$$\text{Upper tone difference} = ((r - \text{upper } r)^2 + (g - \text{upper } g)^2 + (b - \text{upper } b)^2)^{0.5} \quad (1)$$

$$\text{Lower tone difference} = ((r - \text{lower } r)^2 + (g - \text{lower } g)^2 + (b - \text{lower } b)^2)^{0.5} \quad (2)$$

The second determination section 42 determines whether or not the upper tone difference and the lower tone difference calculated with the equations (1) and (2) are greater than or equal to a determination value used in the determination of the tone difference to determine whether or not the tone difference of the pixel of interest 72 and the upper and lower pixels 71 is greater than or equal to a constant. The determination value is set in advance and stored in the control unit 30, and the second determination section 42 carries out the determination by comparing the stored determination value and the calculated upper tone difference and lower tone difference. If determined that the tone difference of the pixel of interest 72 and the upper and lower pixels 71 is not greater than or equal to a constant through such determination (No in step ST201), that is, if the upper tone difference and the lower tone difference are smaller than the determination value, the process proceeds to step ST214 to be described later.

If determined that the tone difference of the pixel of interest 72 and the upper and lower pixels 71 is greater than or equal to a constant (Yes in step ST201), a maximum brightness α and a minimum brightness β of the pixel 71 in the first determination filter 46 are obtained (step ST202). This calculation is carried out by the brightness calculation section 43 of the image processing circuit 34. The brightness calculation section 43 selects a total of eleven pixels 71, the pixel of interest 72 and five pixels 71 on each side of the pixel of interest 72, in the sub-scanning direction using the first determination filter 46, and calculates the brightness of the eleven pixels 71 based on the RGB data of each pixel 71. Furthermore, the calculated brightness are compared to obtain the maximum brightness α and the minimum brightness β in the brightness of the eleven pixels 71.

The maximum brightness γ and the minimum brightness δ of the pixel 71 in the second determination filter 47 are then obtained (step ST203). This calculation is carried out by the brightness calculation section 43 through a method similar to when obtaining the maximum brightness α and the minimum brightness β. In other words, the brightness calculation section 43 selects a total of nine pixels 9, the pixel of interest 72 and four pixels 71 on each side of the pixel of interest 72, in the sub-scanning direction using the second determination filter 47, and calculates the brightness of the nine pixels 71 based on the RGB data of the respective pixel 71. The calculated brightness are compared to obtain the maximum brightness γ and the minimum brightness δ in the brightness of the nine pixels 71.

Whether or not the minimum brightness β in the pixel 71 selected by the first determination filter 46 is greater than a slice A or whether or not the maximum brightness α in the pixel 71 selected by the first determination filter 46 is smaller than a slice B is then determined (step ST204). This determination is carried out by the first determination section 41 of the image processing circuit 34. The slice A and the slice B used in the determination are parameters for determining whether or not the plurality of pixels 71 such as the pixel of interest 72 selected by the first determination filter 46 are entirely bright or entirely dark.

That is, the slice A is a parameter for determining whether or not the plurality of pixels 71 selected by the first determination filter 46 is entirely close to white by determining whether or not the minimum brightness β in the pixel 71 selected by the first determination filter 46 including the pixel of interest 72 is greater than a predetermined value. The slice B is a parameter for determining whether or not the plurality of pixels 71 selected by the first determination filter 46 is entirely close to black by determining whether or not the maximum brightness α in the pixel 71 selected by the first determination filter 46 including the pixel of interest 72 is smaller than the predetermined value. The slice A and the slice B are set in advance with values for making such determination, and are stored in the control unit 30.

The first determination section 41 determines whether or not the selected pixel 71 is entirely close to white by determining whether or not the minimum brightness β, which is the brightness of the darkest portion in the pixel 71 selected by the first determination filter 46, is greater than the slice A. The first determination section 41 also determines whether or not the selected pixel 71 is entirely close to black by determining whether or not the maximum brightness α, which is the brightness of the brightest portion in the pixel 71 selected by the first determination filter 46, is smaller than the slice B.

If determined by the determination of the first determination section 41 that the minimum brightness β is greater than the slice A and the pixel 71 is entirely close to white, or that the maximum brightness α is smaller than the slice B and the selected pixel 71 is entirely close to black (Yes in step ST204), the pixel of interest 72 is corrected by the first correction filter 51 (step ST205). The correction of the pixel of interest 72 using the first correction filter 51 is carried out by the image processing circuit 34 also arranged as the correction unit for correcting the tone data of the pixel of interest 72 based on the correction filter selected by the first determination section 41.

The first correction filter 51 has a function of adding up the values of the R, G, B of each of the total of eight pixels 71 including the four pixels 71 on each side of the pixel of interest 72 sandwiching the pixel of interest 72 in the sub-scanning direction, dividing the resultant value by eight, and substituting the calculated value for the value of the R, G, B of the pixel of interest 72.

Figure 9:
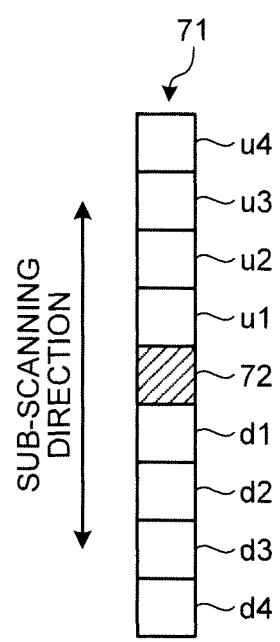
FIG. 9 is an explanatory view of a correction filter.

FIG. 9 is an explanatory view of the correction filter. Describing the calculation performed using the first correction filter 51, it is assumed first the pixels 71 positioned on one side when viewed from the pixel of interest 72 of the plurality of pixels 71 lined on both sides of the pixel of interest 72 in the sub-scanning direction are a first upper pixel u1, a second upper pixel u2, a third upper pixel u3, and a fourth upper pixel u4 from the side closest to the pixel of interest 72. It is assumed the pixels 71 positioned on the other side when viewed from the pixel of interest 72 as a first lower pixel d1, a second lower pixel d2, a third lower pixel d3, and a fourth lower pixel d4 from the side closest to the pixel of interest 72.

The values of R, G, B of the plurality of pixels 71 positioned above and below the pixel of interest 72 are represented as Ru1, Gu1, Bu1 in the first upper pixel u1, Ru2, Gu2, Bu2 in the second upper pixel u2, and Rd1, Gd1, Bd1 in the first lower pixel d1, and similarly for other pixels 71. In this case, the first correction filter 51 has a function of calculating the values of r, g, b of the pixel of interest 72 through the following equations (3) to (5).

$$r = (Ru1 + Ru2 + Ru3 + Ru4 + Rd1 + Rd2 + Rd3 + Rd4)/8 \quad (3)$$

$$g = (Gu1 + Gu2 + Gu3 + Gu4 + Gd1 + Gd2 + Gd3 + Gd4)/8 \quad (4)$$

$$b = (Bu1 + Bu2 + Bu3 + Bu4 + Bd1 + Bd2 + Bd3 + Bd4)/8 \quad (5)$$

That is, in the first correction filter 51, the value of the respective R of the eight pixels 71 are all added up and divided by eight to have such calculated value as the value of R of the pixel of interest 72, the value of the respective G of the eight pixels 71 are all added up and divided by eight to have such calculated value as the value of G of the pixel of interest 72, and the value of the respective B of the eight pixels 71 are all added up and divided by eight to have such calculated value as the value of B of the pixel of interest 72. Thus, the first correction filter 51 has a function of correcting the RGB data of the pixel of interest 72 using the RGB data of the upper and lower pixels 71 of the pixel of interest 72 excluding the pixel of interest 72. The image processing circuit 34 performs averaging of a maximum extent in wide range by correcting the RGB data of the pixel of interest 72 using the first correction filter 51.

If determined by the determination of the first determination section 41 that the minimum brightness β is not greater than the slice A and the maximum brightness α is not smaller than the slice B (No in step ST204), whether or not (α−β) is smaller than a slice C is then determined (step ST206). This determination is performed by the first determination section 41 of the image processing circuit 34. The slice C used in the determination is a parameter for determining whether the plurality of pixels 71 selected by the first determination filter 46 is a halftone, that is, a halftone in wide range.

That is, the slice C is a parameter for determining whether or not the plurality of pixels 71 selected by the first determination filter 46 have small change in brightness by determining whether or not the value in which the minimum brightness β is subtracted from the maximum brightness α in the pixel 71 selected by the first determination filter 46 is greater than a predetermined value. The slice C is set in advance with a value for making such determination, and is stored in the control unit 30. The first determination section 41 determines whether or not the selected pixel 71 is a halftone by determining whether or not the value obtained by subtracting the minimum brightness β, which is the brightness of the darkest portion, from the maximum brightness α, which is the brightness of the brightest portion, in the pixel 71 selected by the first determination filter 46 including the pixel of interest 72 is smaller than the slice C.

If determined that (α−β) is smaller than the slice C by the determination of the first determination section 41 (Yes in step ST206), determination is made whether or not (α−β) is smaller than the slice D by the first determination section 41 (step ST207). A slice D used in the determination is a parameter for determining whether the plurality of pixels 71 selected by the first determination filter 46 are the flat portions or the edge portions.

That is, the slice D is a parameter for determining whether or not the plurality of pixels 71 selected by the first determination filter 46 have a large change in brightness by determining whether or not a value obtained by subtracting the minimum brightness β from the maximum brightness α in the pixel 71 selected by the first determination filter 46 including the pixel of interest 72 is greater than a predetermined value. The slice D is set in advance with a value for making such determination, and is stored in the control unit 30. The first determination section 41 determines whether the selected pixel 71 is the flat portion or the edge portion by determining whether or not the value obtained by subtracting the minimum brightness β, which is the brightness of the darkest portion, from the maximum brightness α, which is the brightness of the brightest portion in the pixel 71 selected by the first determination filter 46 including the pixel of interest 72 is smaller than the slice D.

If determined that (α−β) is smaller than the slice D by the determination of the first determination section 41 (Yes in step ST207), the pixel of interest 72 is corrected with the second correction filter 52 (step ST208). That is, if determined the plurality of pixels 71 selected by the first determination filter 46 are flat portions by the determination that (α−β) is smaller than the slice D, the pixel of interest 72 is corrected using the second correction filter 52.

The second correction filter 52 has the same function as the first correction filter 51, and the RGB data of the pixel of interest 72 is corrected through a method similar to the method of when correcting the RGB data of the pixel of interest 72 using the first correction filter 51. In other words, the values of r, g, b of the pixel of interest 72 are calculated with the above equations (3) to (5) to correct the RGB data. The image processing circuit 34 corrects the RGB data of the pixel of interest 72 using the second correction filter 52 to perform averaging of a maximum extent in wide range.

If determined that (α−β) is not smaller than the slice D by the determination of the first determination section 41 (No in step ST207), on the other hand, the pixel of interest 72 is corrected with the third correction filter 53 (step ST209). That is, if determined that the plurality of pixels 71 selected by the first determination filter 46 are edge portions by the determination that the (α−β) is not smaller than the slice D, the pixel of interest 72 is corrected using the third correction filter 53.

The third correction filter 53 has a function of adding the values of R, G, B of a total of six pixels 71 including the three pixels 71 on each side of the pixel of interest 72 sandwiching the pixel of interest 72 in the sub-scanning direction, doubling the values of R, G, B of the pixel of interest 72 and adding the same to the above value and dividing by eight, and having the calculated value as the values of the R, G, B of the pixel of interest 72. Specifically, the third correction filter 53 has a function of calculating the values of r, g, b of the pixel of interest 72 through the following equations (6) to (8).

$$r = (Ru1 + Ru2 + Ru3 + Rd1 + Rd2 + Rd3 + r \times 2)/8 \quad (6)$$

$$g = (Gu1 + Gu2 + Gu3 + Gd1 + Gd2 + Gd3 + g \times 2)/8 \quad (7)$$

$$b = (Bu1 + Bu2 + Bu3 + Bd1 + Bd2 + Bd3 + b \times 2)/8 \quad (8)$$

In other words, in the third correction filter 53, the value of R of the pixel of interest 72 is doubled and added to a value obtained by adding up all the values of R of the six pixels 71, and then the resultant value is divided by eight to be substituted for the value of R of the pixel of interest 72. The value of G of the pixel of interest 72 is doubled and added to a value obtained by adding up all the values of G of the six pixels 71, and then the resultant value is divided by eight to be assumed as the value of G of the pixel of interest 72. The value of B of the pixel of interest 72 is doubled and added to a value obtained by adding up all the values of B of the six pixels 71, and then the resultant value is divided by eight to be substituted for the value of B of the pixel of interest 72. Therefore, the third correction filter 53 has a function of correcting the RGB data of the pixel of interest 72 using the RGB data of the pixel of interest 72 and the upper and lower pixels 71 of the pixel of interest 72. The image processing circuit 34 corrects the RGB data of the pixel of interest 72 using the third correction filter 53 to moderately perform averaging.

On the contrary, if determined that (α−β) is not smaller than the slice C by the determination of the first determination section 41 (No in step ST206), whether or not (γ−δ) is smaller than a slice E is then determined by the first determination section 41 (step ST210). The slice E used in the determination is a parameter for determining whether or not the plurality of pixels 71 selected by the second determination filter 47 including the pixel of interest 72 is a halftone, that is, whether or not a halftone in narrow range.

That is, the slice E is a parameter for determining whether or not the plurality of pixels 71 selected by the second determination filter 47 have a small change in brightness by determining whether or not a value obtained by subtracting the minimum brightness δ from the maximum brightness γ in the pixel 71 selected by the second determination filter 47 including the pixel of interest 72 is greater than a predetermined value. The slice E is set in advance with a value for making such determination, and is stored in the control unit 30. The first determination section 41 determines whether the selected pixel 71 is the halftone by determining whether or not the value obtained by subtracting the minimum brightness δ, which is the brightness of the darkest portion, from the maximum brightness γ, which is the brightness of the brightest portion in the pixel 71 selected by the second determination filter 47 including the pixel of interest 72 is smaller than the slice E.

If determined that (γ−δ) is smaller than the slice E by the determination of the first determination section 41 (Yes in step ST210), whether or not (γ−δ) is smaller than a slice F is then determined by the first determination section 41 (step ST211). The slice F used in the determination is a parameter for determining whether the plurality of pixels 71 selected by the second determination filter 47 including the pixel of interest 72 are the flat portions or the edge portions.

That is, the slice F is a parameter for determining whether or not the plurality of pixels 71 selected by the second determination filter 47 have a large change in brightness by determining whether or not a value obtained by subtracting the minimum brightness δ from the maximum brightness γ in the pixel 71 selected by the second determination filter 47 including the pixel of interest 72 is greater than a predetermined value. The slice F is set in advance with a value for making such determination, and is stored in the control unit 30. The first determination section 41 determines whether the selected pixel 71 is the flat portion or the edge portion by determining whether or not the value obtained by subtracting the minimum brightness δ, which is the brightness of the darkest portion, from the maximum brightness γ, which is the brightness of the brightest portion in the pixel 71 selected by the second determination filter 47 including the pixel of interest 72 is smaller than the slice F.

If determined that (γ−δ) is smaller than the slice F by the determination of the first determination section 41 (Yes in step ST211), the pixel of interest 72 is corrected with the fourth correction filter 54 (step ST212). That is, if determined that the plurality of pixels 71 selected by the second determination filter 47 including the pixel of interest 72 are flat portions by the determination that (γ−δ) is smaller than the slice F, the pixel of interest 72 is corrected using the fourth correction filter 54.

The fourth correction filter 54 has the same function as the third correction filter 53, and the RGB data of the pixel of interest 72 is corrected through a method similar to the method of when correcting the RGB data of the pixel of interest 72 using the third correction filter 53. In other words, the values of r, g, b of the pixel of interest 72 are calculated with the above equations (6) to (8) to correct the RGB data. The image processing circuit 34 corrects the RGB data of the pixel of interest 72 using the fourth correction filter 54 to perform averaging of a maximum extent in narrow range.

If determined that (γ−δ) is not smaller than the slice F by the determination of the first determination section 41 (No in step ST211), the pixel of interest 72 is corrected with the fifth correction filter 55 (step ST213). That is, if determined that the plurality of pixels 71 selected by the second determination filter 47 including the pixel of interest 72 are edge portions by the determination that (γ−δ) is not smaller than the slice F, the pixel of interest 72 is corrected using the fifth correction filter 55.

The fifth correction filter 55 has a function of doubling and adding the values of R, G, B of a total of three pixels 71 including the pixel of interest 72 and two adjacent pixels 71 sandwiching the pixel of interest 72 in the sub-scanning direction, and adding to such values, the values of R, G, B of the two pixels 71 sandwiching the three pixels 71 in the sub-scanning direction and dividing the resultant value by eight, and having the calculated value as the values of the R, G, B of the pixel of interest 72. Specifically, the fifth correction filter 55 has a function of calculating the values of r, g, b of the pixel of interest 72 through the following equations (9) to (11).

$$r = ((Ru1 + Rd1 + r) \times 2) + Ru2 + Rd2)/8 \quad (9)$$

$$g = ((Gu1 + Gd1 + g) \times 2) + Gu2 + Gd2)/8 \quad (10)$$

$$b = ((Bu1 + Bd1 + b) \times 2) + Bu2 + Bd2)/8 \quad (11)$$

In other words, in the fifth correction filter 55, the value of R of the pixel of interest 72 and the two adjacent pixels 71 on both sides of the pixel of interest 72 are all doubled and added, the value of R of the two adjacent pixels 71 sandwiching such pixels are added thereto and divided by eight, and the resultant value is substituted for the value of R of the pixel of interest 72. The value of G of the pixel of interest 72 and the two adjacent pixels 71 on both sides of the pixel of interest 72 are all doubled and added, the value of G of the two adjacent pixels 71 sandwiching such pixels are added thereto and divided by eight, and the resultant value is substituted for the value of G of the pixel of interest 72. The value of B of the pixel of interest 72 and the two adjacent pixels 71 on both sides of the pixel of interest 72 are all doubled and added, the value of B of the two adjacent pixels 71 sandwiching such pixels are added thereto and divided by eight, and the resultant value is substituted for the value of B of the pixel of interest 72.

Therefore, the fifth correction filter 55 has a function of correcting the RGB data of the pixel of interest 72 using the RGB data of the pixel of interest 72 and the upper and lower pixels 71 of the pixel of interest 72. The image processing circuit 34 corrects the RGB data of the pixel of interest 72 using the fifth correction filter 55 to output the pixel 71 in the range selected by the second determination filter 47 to the post-stage in the processing step without barely averaging.

If determined that (γ−δ) is not smaller than the slice E by the determination of the first determination section 41 (No in step ST210), or if determined that the tone difference of the pixel of interest 72 and the upper and lower pixels 71 is not greater than or equal to a constant according to the determination of the second determination section 42 (No in step ST201), the pixel of interest 72 is output to the post-stage in the processing step without processing (step ST214).

When performing the process of removing the horizontal stripes of the image of the document 70 read by the image processing section 31 based on the light received by the line sensor 11, the necessary procedure is performed on the pixel of interest 72 in accordance with the upper and lower pixels 71 of the pixel of interest 72 using the determination filter and the correction filter. After the procedures is performed on the predetermined pixel of interest 72, it is output to the post-stage in the processing step such as outputting to the information equipment terminal 60 through the data transfer circuit 35, once storing in the image processing memory 33, and the like, for example, and then the process on the pixel of interest 72 is terminated. After the process on the predetermined pixel of interest 72 is terminated, the above-described process is performed on the pixel 71 not subjected to the above-described process as the pixel of interest 72. This is repeated so that the above-described process is performed on all the pixels 71. The RGB data of the pixel 71 at the horizontal stripe portion in the image data is thus corrected in accordance with the RGB data of the surrounding pixels 71, whereby the horizontal stripes in the image data are removed.

That is, the data after the correction is performed by performing the process described above is saved in a different region, and the data used for the determination when selecting the correction filter or the correction in the correction filter is merely the original image data. The image processing section 31 repeats correcting the original image data and outputting the corrected data to the post-stage in the processing step of the image processing to remove the horizontal stripes in the image data.

When reading the image of the document 70 in the overhead image reading apparatus 1, the image information of the read document 70 is transmitted from the data transfer circuit 35 to the information equipment terminal 60, and an appropriate or arbitrary processes such as shading and cropping is performed in the information equipment terminal 60.

The image processing section 31 of the overhead image reading apparatus 1 includes the first determination section 41 for selecting the correction filter for correcting the pixel of interest 72 based on the brightness of the pixel 71 in the determination filter, and the image processing circuit 34 for correcting the pixel of interest 72 based on the selected correction filter. Thus, the pixel of interest 72 can be appropriately corrected by the correction filter according to the state of the upper and lower pixels 71 of the pixel of interest 72. The determination filter is arranged in plurals in which the number of pixels 71 to be used in the sub-scanning direction is different, so that the pixel of interest 72 can be more appropriately corrected according to the degree of change in the upper and lower pixels 71 of the pixel of interest 72, and the pixel of interest 72 can be coordinated with the upper and lower pixels 71. As a result, the horizontal stripes of the image caused by the flickers can be removed with a simple software configuration.

The number of pixels 71 to be used in the correction filter is less than the number of pixels 71 to be used in the determination filter, hence the unnecessary image can be suppressed from appearing outside the range of a predetermined image in the image data. That is, when the correction filter and the determination filter have the same size, for example, if averaged in wide range including also the tone data of the character image and then averaged in narrow range without including the tone data of the character image immediately close to the character image, the image data of when averaged including the tone data of the character image in wide range may remain at a position distant from the character image at the periphery of the character image and the like. Thus, an image similar to a piping or edged portion may appear at the periphery of the character image. On the contrary, since the tone data near the end of the determination filter is not included when correcting the pixel of interest 72 by making the range of the correction filter smaller than the range of the determination filter, such unnecessary image can be suppressed from appearing. As a result, the image data can be more appropriately corrected.

Since the first determination filter 46 and the second determination filter 47 are used for the determination filter and the determination filter for selecting the correction filter is changed according to the pixel of interest 72 and the upper and lower pixels 71 of the pixel of interest 72, the pixel of interest 72 can be more appropriately corrected according to the state of the image. In other words, even the edge portion has an extent, and the pixel of interest 72 can be more appropriately corrected by changing the determination filter according to such extent, so that the effect of removing the horizontal stripes can be enhanced as a result.

The parameter used when selecting the correction filter can be reduced since the brightness of the pixel of interest 72 and the pixel 71 is used when selecting the correction filter. As a result, the processing speed in removing the horizontal stripes of the image can be enhanced.

Furthermore, the flat portion and the edge portion of the image can be determined by using a plurality of determination filters, where the step-wise determination can be made by making the determination combining the same. As a result, the pixel of interest 72 can be more appropriately corrected, and the effect of removing the horizontal stripes can be enhanced.

The second determination section 42 for determining the tone difference of the upper and lower pixels 71 of the pixel of interest 72 is arranged, and whether or not to correct the pixel of interest 72 is determined according to the determination result, so that the calculation process of the correction may not be performed in the pixel of interest 72 that does not need correction. As a result, the processing speed can be enhanced.

The overhead image reading apparatus 1 according to the present embodiment includes the image processing section 31, so that the pixel of interest 72 in the image data can be matched with the upper and lower pixels 71 when reading the image information by the optical unit 10 while moving the reading position in the sub-scanning direction from the upper side of the document 70. As a result, the horizontal stripes of the image caused by the flickers can be removed with a simple configuration.

The optical unit 10 includes the line sensor 11 in which the light receiving elements are arrayed one dimensionally, and the image processing section 31 is arranged in the overhead image reading apparatus 1 for reading the image information while moving the reading position in the optical unit 10 in the sub-scanning direction, so that the horizontal stripes that appear periodically in the sub-scanning direction can be more reliably removed.

The image correcting method according to the present embodiment includes selecting the correction filter for correcting the pixel of interest 72 based on the brightness of the pixel 71 in the determination filter, and correcting the pixel of interest 72 based on the selected correction filter, whereby the pixel of interest 72 can be appropriately corrected by the correction filter according to the state of the upper and lower pixels 71 of the pixel of interest 72. The correction filter is selected by a plurality of determination filters in which the number of pixels 71 to be used in the sub-scanning direction is different, hence the pixel of interest 72 can be more appropriately corrected according to the degree of change in the upper and lower pixels 71 of the pixel of interest 72, and the pixel of interest 72 can be matched with the upper and lower pixels 71. As a result, the horizontal stripes of the image caused by the flickers can be removed with a simple configuration.

The program according to the present embodiment causes the image processing section 31 to select the correction filter for correcting the pixel of interest 72 based on the brightness of the pixel 71 in the determination filter, and correct the pixel of interest 72 based on the selected correction filter, whereby the pixel of interest 72 can be appropriately corrected by the correction filter according to the state of the upper and lower pixels 71 of the pixel of interest 72. The correction filter is selected by a plurality of determination filters in which the number of pixels 71 to be used in the sub-scanning direction is different, and hence the pixel of interest 72 can be more appropriately corrected according to the degree of change in the upper and lower pixels 71 of the pixel of interest 72, and the pixel of interest 72 can be matched with the upper and lower pixels 71. As a result, the horizontal stripes of the image caused by the flickers can be removed with a simple configuration.

In the embodiment described above, the first determination section 41 selects the correction filter for correcting the pixel of interest 72 based on the brightness of the pixel 71 in the determination filter, but may select the correction filter based on other than the brightness of the pixel 71. For instance, the correction filter may be selected based on a luminance component of the pixel 71 in the determination filter. The method of selecting the correction filter by the first determination section 41 may use other than the brightness of the pixel 71 as long as it is a method of appropriately and easily carrying out the state of the upper and lower pixels 71 of the pixel of interest 72.

The number of pixels 71 in the sub-scanning direction of the determination filter and the number of pixels 71 used in correcting the pixel of interest 72 with the correction filter are preferably set appropriately according to the resolution and the like of when generating the image data with the overhead image reading apparatus 1. That is, the image data is to be corrected to an extent the horizontal stripes caused by the flickers cannot be recognized as a line by human eye, and hence the horizontal stripes that can be recognized by human eye can be reduced by appropriately setting the number of pixels 71 so as to be a tone value of an extent it cannot be recognized as a line by human eye.

In the embodiment described above, two types of determination filter are set, and five types of correction filter are set, but the determination filter and the correction filter may be set to other number of types. The determination filter and the correction filter may be of other numbers as long as they are set according to the resolution and the like of when generating the image data with the overhead image reading apparatus 1.

In the embodiment described above, the image processing section 31 is used for the image correction apparatus, but the image correction apparatus may use the information equipment terminal 60. That is, the image data acquired by the image processing section 31 may be transmitted to the information equipment terminal 60 before performing the correction, and the process of removing the horizontal stripes through the image correction method described above may be performed in the information equipment terminal 60.

In the overhead image reading apparatus 1 described above, the reading position on the document 70 is moved in the sub-scanning direction by rotating the optical unit 10 with the rotation axis RA as a center, but the reading position may be moved in the sub-scanning direction other than by the rotation of the optical unit 10. For instance, the reading position may be moved in the sub-scanning direction by parallel moving the optical unit 10 with respect to the document 70 in the sub-scanning direction.

In the overhead image reading apparatus 1 described above, the program for causing the image processing section 31 to perform the correction of the image data is described to be stored in the storage section of the control unit 30, but the program may be stored in the information equipment terminal 60 and the correction of the image data may be carried out by performing the calculation process by the program stored in the information equipment terminal 60. That is, the overhead image reading apparatus 1 may be controlled and operated according to the request or command from an external apparatus mounted with the software (include program, data, etc.) for causing the process described above to be performed on the image processing section 31.

Furthermore, the processing procedure, the control procedure, and the specific names shown in the description made above and in the figures, the contents of the determination filter, the correction filter, and the like can be arbitrarily changed unless specifically mentioned.

With respect to the overhead image reading apparatus 1, each configuring component illustrated in the figure is function-conceptual, and does not necessarily need to be physically configured as illustrated. For instance, the processing function of each apparatus of the overhead image reading apparatus 1, in particular, each processing function performed by the control unit 30 may have the entire portion or an arbitrary portion realized by the CPU and a program interpreted and executed by the CPU, or may be realized as hardware by the wired logic. The program is recorded on the recording medium, to be described later, and mechanically read to the overhead image reading apparatus 1 as necessary. In other words, the computer programs for performing various types of processes are recorded in the storage section such as the ROM or the HDD (hard disk drive). The computer programs are executed by being loaded in the RAM, and cooperatively operate with the CPU to configure the control unit 30.

The computer program may be stored in an application program server connected to the overhead image reading apparatus 1 through an arbitrary network, and may be entirely or partially downloaded as necessary.

The program according to the present invention may be stored in a computer readable recording medium, or may be configured as a program product. The "recording medium" includes an arbitrary "portable physical medium" such as a memory card, a USB (universal serial bus) memory, an SD (secure digital) card, a flexible disc, a magneto optical (MO) disc, a ROM, an EPROM, an EEPROM, a CD-ROM, an MO, a DVD (digital versatile disc) and a Blu-ray (trademark) disc.

The "program" is a data processing method described with an arbitrary language or describing method, and may take a form of source code, binary code, and the like. The "program" is not necessarily limited to being singularly configured, and may be configured in a distributed manner as a plurality of modules or libraries, or may be cooperatively operated with another program represented by OS (Operating System) to achieve the function. The specific configuration and the reading procedure for reading the recording medium in each device shown in the embodiment, and the installing procedure after reading and the like may be well-known configurations and procedures.

The various types of databases stored in the storage section include a memory device such as a RAM and ROM, a fixed disc device such as a hard disk, and a storage device such as a flexible disc and optical disc, where various types of programs, tables, databases, web page files, and the like to be used in various processes and website provision are stored.

The specific form of distribution and integration of the devices is not limited to that illustrated, and may be entirely or partially configured by being functionally or physically distributed and integrated in an arbitrary unit according to various types of additions and the like or according to the function load. In other words, the embodiments described above may be arbitrarily combined and implemented, or the embodiments may be selectively implemented.

The image correction apparatus, the overhead image reading apparatus, the image correction method, and the program according to the present embodiment have an effect of being able to remove the horizontal stripes of the image caused by the flickers with a simple configuration.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image correction apparatus comprising:
a read image acquiring unit that acquires read image data generated by an imaging device that moves in a sub-scanning direction with respect to a reading medium irradiated with an environmental light to read the reading medium;
a selecting unit that selects a correction filter for correcting a pixel of interest in the acquired read image data based on brightness or luminance component of a pixel in a determination filter including the pixel of interest; and
a correction unit that corrects tone data of the pixel of interest based on the correction filter selected by the selecting unit, wherein
the determination filter includes a plurality of determination filters in which a number of pixels to be used in the sub-scanning direction differs.

2. The image correction apparatus according to claim 1, wherein
the correction filter includes a filter for correcting the pixel of interest using the tone data of the plurality of pixels, and
the number of pixels to be used in the correction filter is less than the number of pixels to be used in the determination filter.

3. An overhead image reading apparatus comprising:
the image correction apparatus according to claim 1;
an imaging device supporting section for arranging the imaging device above the reading medium; and
a sub-scanning direction driving section for moving a reading position on the reading medium in the imaging device in the sub-scanning direction.

4. The overhead image reading apparatus according to claim 3, wherein
the imaging device includes light receiving elements arrayed one-dimensionally, and the sub-scanning direction driving section moves the reading position in the imaging device in the sub-scanning direction by relatively rotating the imaging device with respect to the reading medium with a rotation axis parallel to the arraying direction of the light receiving elements as a center.

5. An image correction method comprising:

acquiring read image data generated by an imaging device that moves in a sub-scanning direction with respect to a reading medium irradiated with an environmental light to read the reading medium;

selecting a correction filter for correcting a pixel of interest in the acquired read image data based on brightness or luminance component of a pixel including the pixel of interest in a plurality of determination filters in which number of pixels to be used in the sub-scanning direction differs; and correcting tone data of the pixel of interest based on the correction filter selected by the selecting.

6. A non-transitory tangible computer readable storage medium storing therein a program for an image correction method, the method comprising:

acquiring read image data generated by an imaging device that moves in a sub-scanning direction with respect to a reading medium irradiated with an environmental light to read the reading medium;

selecting a correction filter for correcting a pixel of interest in the acquired read image data based on brightness or luminance component of a pixel including the pixel of interest in a plurality of determination filters in which number of pixels to be used in the sub-scanning direction differs; and correcting tone data of the pixel of interest based on the correction filter selected by the selecting.

* * * * *